April 8, 1952     H. O. ENGSTROM     2,592,129
METHOD OF MAKING A SELF-LOCKING NUT
Filed Oct. 29, 1948     3 Sheets-Sheet 1
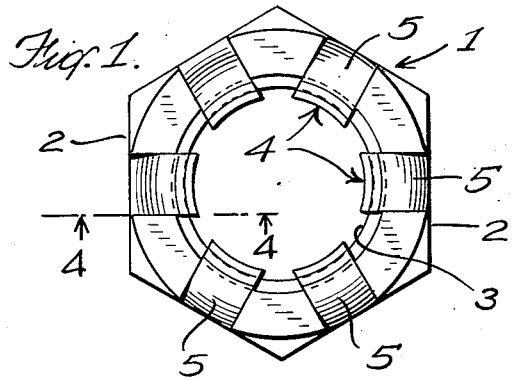
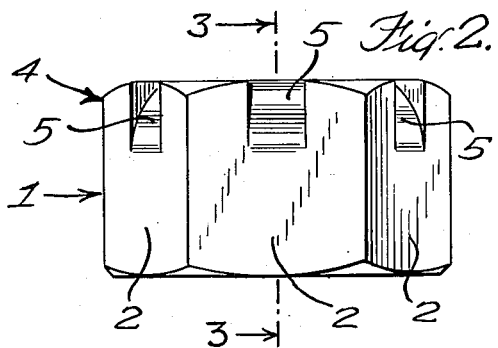
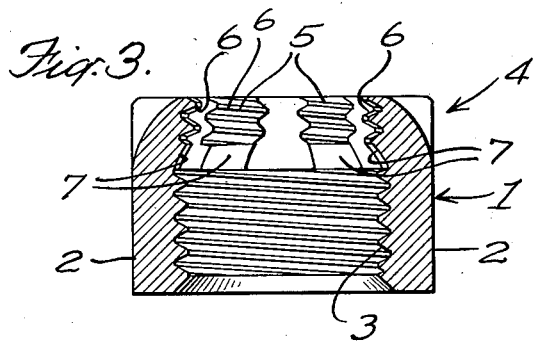
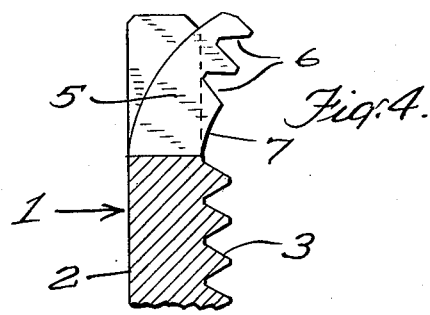
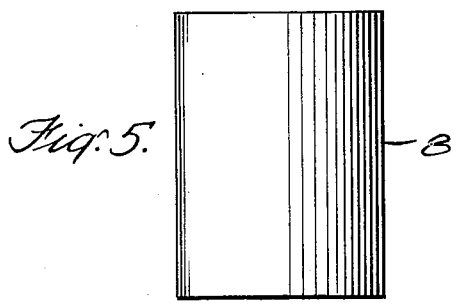
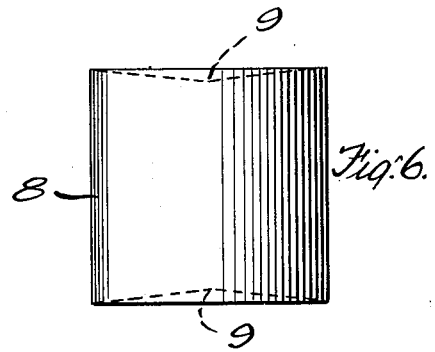
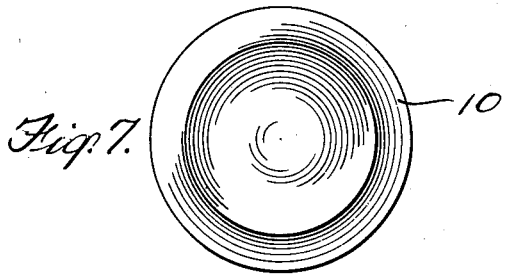
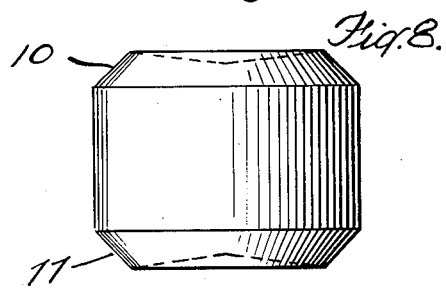
INVENTOR
HENRY O. ENGSTROM
BY
George F. Gill
ATTORNEY April 8, 1952     H. O. ENGSTROM     2,592,129
METHOD OF MAKING A SELF-LOCKING NUT
Filed Oct. 29, 1948     3 Sheets-Sheet 2
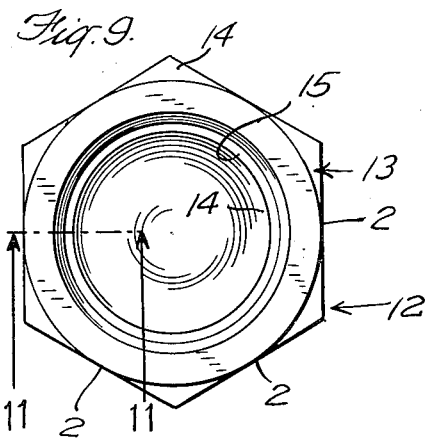
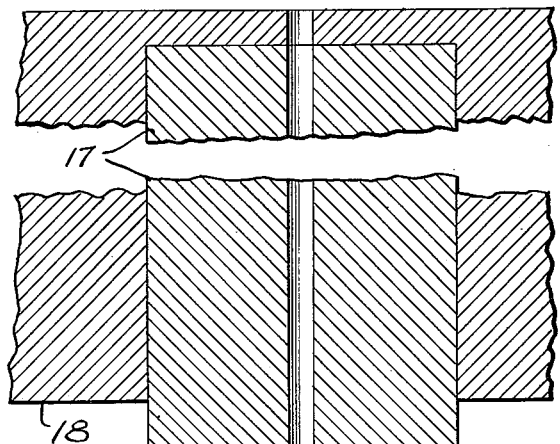
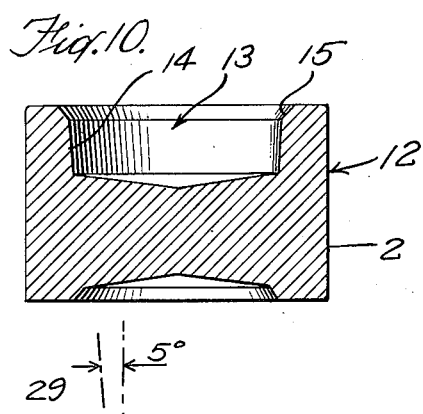
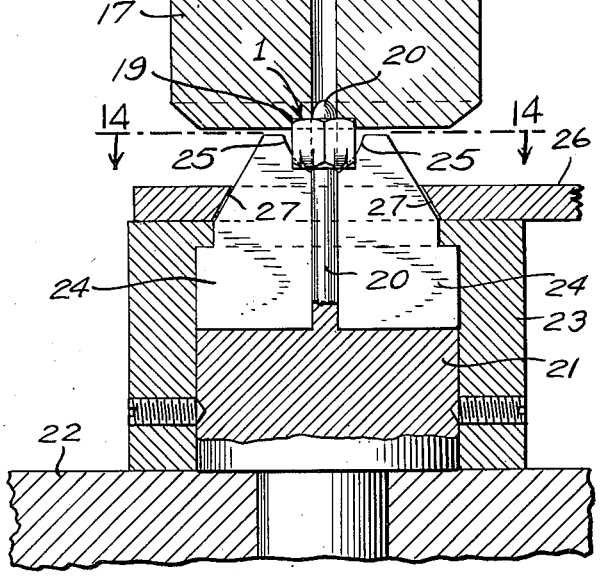
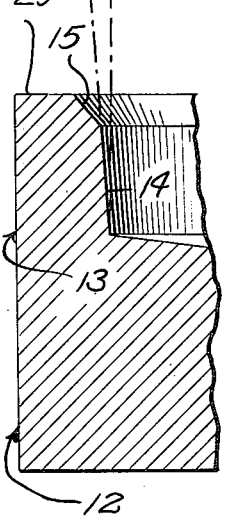
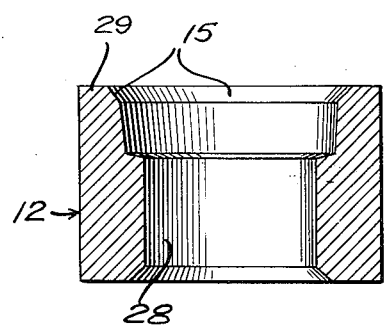
INVENTOR
HENRY O. ENGSTROM
BY George T. Gill
ATTORNEY April 8, 1952 — H. O. ENGSTROM — 2,592,129
METHOD OF MAKING A SELF-LOCKING NUT
Filed Oct. 29, 1948 — 3 Sheets-Sheet 3
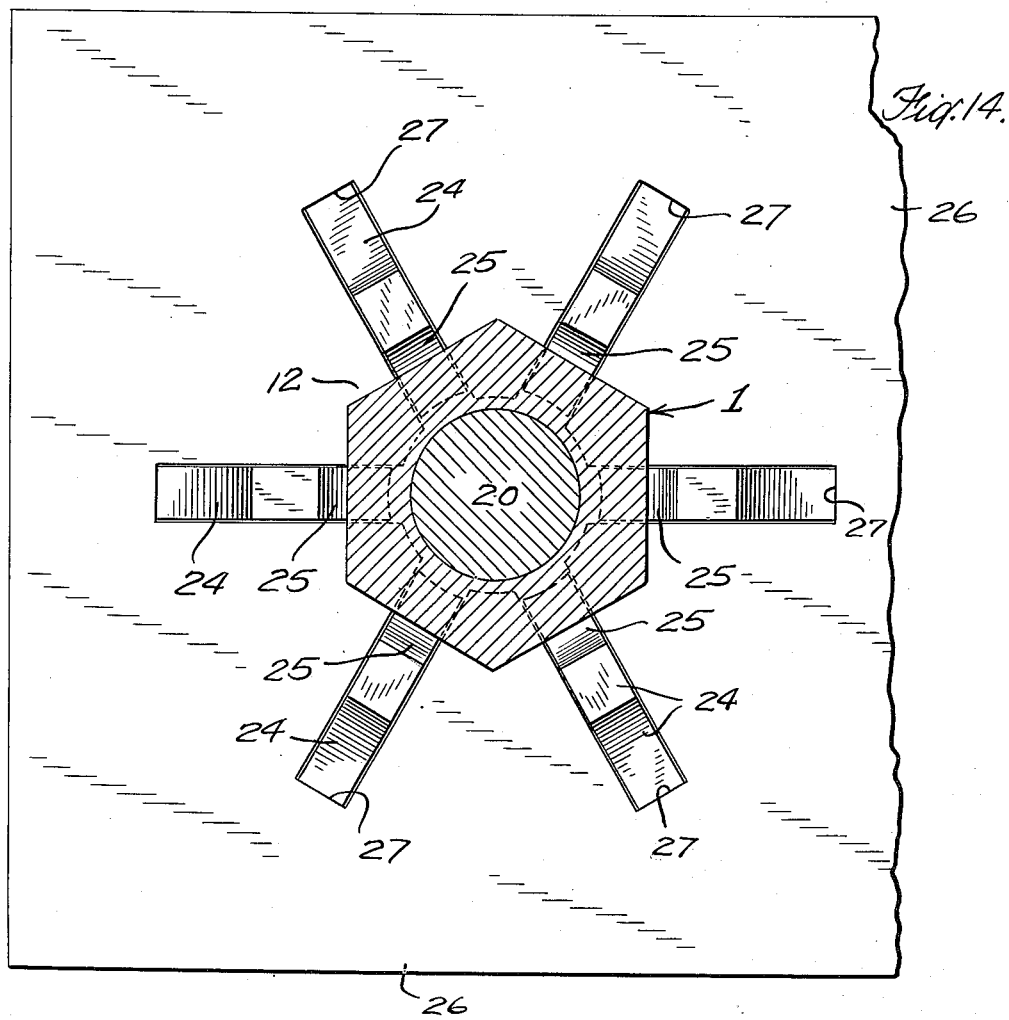
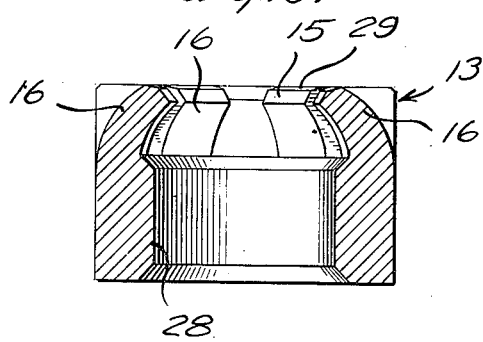
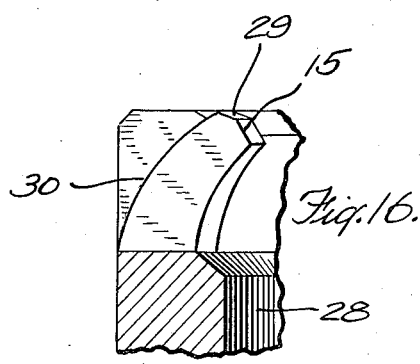
INVENTOR
HENRY O. ENGSTROM
BY George T. Gill
ATTORNEY Patented Apr. 8, 1952

2,592,129

UNITED STATES PATENT OFFICE 2,592,129

METHOD OF MAKING A SELF-LOCKING NUT

Henry O. Engstrom, New Canaan, Conn., assignor to Richard W. Luce, Southport, Conn.

Application October 29, 1948, Serial No. 57,199

1 Claim. (Cl. 10—86)

The invention herein disclosed relates to a method of making a self-locking nut in which the locking action is effected by resilient, inwardly extending threaded portions at one end of the nut. This application constitutes a continuation in part of my prior applications Serial Nos. 722,939 and 723,878.

An object of the invention is to provide a comparatively inexpensive, all metal self-locking nut that meets the exacting specifications for lock nuts used on aircraft.

The invention is best explained by, and will be more readily understood from, a description of a specific lock nut and the steps of the method of making the lock nut which constitute embodiments of the invention and in which the foregoing object, and certain advantages that will hereinafter appear, are realized. Such a lock nut is disclosed in the accompanying drawings together with illustrations of certain steps in the method of making the lock nut.

The drawings include:

Fig. 1 which is a top, plan view of a lock nut embodying the invention;

Fig. 2 which is a side elevation of the same;

Fig. 3 which is a sectional elevation of the same taken on the line 3—3 of Fig. 2;

Fig. 4 which is a partial, sectional elevation of the same, on enlarged scale, similar to Fig. 3, taken on the line 4—4 of Fig. 1;

Fig. 5 which is an elevation of a solid, cylindrical slug cut from a wire;

Fig. 6 which is an elevation of the same slug with the ends squared and centered;

Fig. 7 which is a plan of the slug following a coining operation;

Fig. 8 which is an elevation of the same;

Fig. 9 which is a plan of a partially formed nut blank drawn from the formed slug shown in Figs. 7 and 8;

Fig. 10 which is a sectional elevation of the same;

Fig. 11 which is a partial, sectional elevation of the same on enlarged scale and taken on the line 11—11 of Fig. 9;

Fig. 12 which is a sectional elevation of the nut blank after it is pierced;

Fig. 13 which is a fragmentary, sectional plan of the operation of cutting the tangs;

Fig. 14 which is a sectional elevation of the same, taken on the line 13—13 of Fig. 12;

Fig. 15 which is an axial, sectional elevation of a nut blank before tapping; and Fig. 16 which is a partial, sectional elevation of the same on enlarged scale.

The self-locking nut illustrated in Figs. 1 to 4 of the drawing is of conventional, hexagonal, outer configuration to provide six wrench faces 2; it will be understood, however, that the outer configuration may take any form. The nut has an axial opening or bore therethrough and a thread 3 therein. At one end of the nut, there is a locking portion, designated generally by the numeral 4.

The locking portion of the particular nut illustrated consists of six resilient tangs 5 or wall sections formed in the end portion of the nut. Each tang is contained within a wrench face and the tangs are symmetrically disposed about the axis of the nut. The tangs have threaded portions 6 at or adjacent the free ends thereof which threaded portions extend radially inwardly slightly beyond the normal diameter of the thread of the nut. The tangs are of lesser thickness than the wall of the nut and the thickness thereof decreases, slightly and gradually from the base, or juncture with the nut body, to the free end thereof, as will more fully hereinafter appear. The outer surface of the tangs constitute continuations of the outer surface of the nut body, and each tang has an unthreaded portion 7 between the threaded portion and the nut body.

The thickness of the tangs is made less than the wall of the nut body by increasing the diameter of the opening through the nut at the locking portion. The tangs or resilient wall sections 5 are formed by shearing the metal of the nut at the locking portion. Each tang is formed by shearing through the wall of the locking portion at spaced, longitudinal planes from the end of the wall of the locking portion to the juncture of the locking portion and the nut body. The shearing cuts completely through the wall and the tangs are bent inwardly on an arc so as to be inclined inwardly towards the axis of the nut. In the particular nut illustrated, each tang is contained within a wrench face.

In Figs. 5 to 14, the steps of the method of making a nut such as above described are illustrated, and from the following description of the nut blanks formed certain additional features of the lock nut will be apparent. The nut blank is desirably and inexpensively made on a header. In the first operation, a slug, such as the slug 8 (Fig. 5), consisting of a piece of round wire, is cut from the end of a coil of wire. The ends of the slug are then squared as illustrated in Fig. 6 and centering depressions 9 are formed in the end faces. Next the slug is partly flattened and domed at each end as shown at 10 and 11, Figs. 7 and 8. Thereafter, the slug is drawn into a partially formed nut blank 12 as shown in Figs. 9 and 10, in which there is a hollow end section 13 that forms the locking section.

In this partially formed nut blank, the inner surface 14 of the wall of the locking section is inclined to the axis of the nut at an angle of five degrees, as indicated in Fig. 11. The inclination of the wall is in a direction to gradually decrease the thickness thereof from its inner end, or from the nut body, to the free end thereof. At the free end of the wall 14, the wall is chamfered as indicated at 15. The internal diameter of the locking section is greater than the bore diameter for the particular size nut.

The blank of Figs. 9 and 10 is next pierced and thereafter, or simultaneously with the piercing, tangs 16 constituting sections of the wall of the locking portion are sheared from the wall of the locking portion 13. Figs. 13 and 14 illustrate the operation of simultaneously piercing the nut blank and forming the inwardly extending tangs 16. A die 17 is secured in the bed plate 18 of a header or punch. The die has a hexagonal recess 19 in which the nut blank is received. A piercing tool 20 extends from a plunger 21 mounted in a movable plate 22 of the header. Secured to the plunger, there is a fixture 23 which holds six shearing plates 24 angularly spaced about the shank of the piercing tool 20. The shearing plates have curved shearing surfaces 25. A stationary stripper plate 26 having slots 27 for the shearing plates serves to strip the nut blank from the piercing tool.

In operation, the nut blank is inserted in the recess 19 while the movable plate 22 of the header is retracted. Upon forward movement, the piercing tool 20 pierces the nut blank to form the axial bore or opening therethrough. Upon further movement, the curved shearing surfaces 25 of the shearing plates 24 engage the wall of the locking section, shear therethrough to form the tangs and bend the tangs inwardly to engage the shank of the piercing tool which acts as a mandrel. Upon return movement, the nut blank is carried on the piercing tool until it engages the stripper plate which strips it from the piercing tool. The result is a nut blank such as shown in Fig. 14.

In the nut blank so formed the pierced opening 28 is of lesser diameter than the internal diameter of the locking section. The internal diameter of the locking section is greater than the diameter of the bore or opening 28 by an amount substantially equal to or slightly greater than the depth of the thread for the particular size nut. When the tangs 16 are sheared and bent inwardly by the curved shearing surfaces 25, the chamfered surface 15 at each tang becomes substantially parallel to the axis of the nut body, and substantially aligned with the wall of the bore 28. The upper surface 29 of the wall becomes inclined to produce the effect of a chamfer. This chamfer is important as it prevents the formation of burrs in the tapping operation. The curved shearing surfaces bend the tangs in on an arc or radius so that the outer surface 30 is arcuate.

The blank so formed is then tapped. The thread is cut in the outer part or portion of each tang which portion extends inwardly beyond the major diameter of the thread. After the tapping operation, the tangs are again bent inwardly to position the threads thereof inwardly beyond the normal diameter of the thread of the nut. By tapering the tangs, as above described, a true cantilever action is obtained and maximum locking effect produced.

Experience has shown that lock nuts such as that illustrated in the drawing and made in accordance with the method above described are comparatively inexpensive to manufacture, efficient and effective in use, reusable, and meet the exacting requirements specified for lock nuts used on aircraft. The features of construction are readily applied to nuts of different shapes and sizes, and to nuts formed from sheet metal.

It will be obvious that various changes may be made by those skilled in the art in the details of the lock nut illustrated in the drawing and described above, and the steps of the method of making the lock nut, within the principle and scope of the invention as expressed in the appended claim.

I claim:

The method of making a self-locking nut of the kind described which method includes the steps of forming a nut blank with an axial bore therethrough, forming a counterbore in one end, shearing the nut blank at spaced planes longitudinally of the nut blank from the counterbored end thereof to a point intermediate the ends thereof by pressing portions of the metal of the counterbored portion inwardly substantially to the diameter of said bore, tapping the nut blank, and thereafter pressing the inwardly pressed portions inwardly beyond the diameter of the tapped bore.

HENRY O. ENGSTROM.

REFERENCES CITED

The following references are of record in the file of this patent:

UNITED STATES PATENTS

| Number | Name | Date |
|---|---|---|
| 2,316,684 | Gade | Apr. 13, 1943 |
| 2,333,290 | Brackett | Nov. 2, 1943 |
| 2,381,110 | Chandler | Aug. 7, 1945 |
| 2,381,111 | Chandler | Aug. 7, 1945 |
| 2,429,832 | Luce | Oct. 28, 1947 |

FOREIGN PATENTS

| Number | Country | Date |
|---|---|---|
| 545,484 | Great Britain | May 28, 1942 |